United States Patent [19]
Jürgens et al.

[11] 3,938,853
[45] Feb. 17, 1976

[54] SHRINK-FIT SLEEVE APPARATUS FOR DRILL STRINGS

[75] Inventors: Rainer Jürgens, Westercelle, Alfred Ostertag, Celle, both of Germany

[73] Assignee: Christensen Diamond Products Company, Salt Lake City, Utah

[22] Filed: Dec. 16, 1974

[21] Appl. No.: 532,745

Related U.S. Application Data

[63] Continuation-in-part of Ser. No. 465,818, May 1, 1974, abandoned.

[52] U.S. Cl. .................................. 308/4 A; 166/241
[51] Int. Cl.² ........................................... F16C 1/26
[58] Field of Search .................... 308/4 A, 6 A, 8.2; 166/241; 175/323

[56] References Cited
UNITED STATES PATENTS

| | | | |
|---|---|---|---|
| 2,263,638 | 11/1941 | Minor | 308/4 A |
| 2,303,689 | 12/1942 | Graham | 308/4 A X |
| 3,051,532 | 8/1962 | Collett | 308/4 A |
| 3,747,700 | 7/1973 | Rilling | 308/4 A X |

Primary Examiner—M. Henson Wood, Jr.
Assistant Examiner—Gene A. Church
Attorney, Agent, or Firm—Bernard Kriegel

[57] ABSTRACT

Sleeve apparatus for mounting on a cylindrical periphery of a drill string, or other running string, including an inner sleeve having cylindrical interior and a conical exterior disposable at any selected location along a drill string member, an outer sleeve being mounted on the inner sleeve and having an inner conical surface companion to the outer conical surface of the inner sleeve, the outer sleeve being shrink-fitted on the inner sleeve, and the latter on the cylindrical periphery of the drill string member by fluid pressure actuated hydraulic means, permitting a safe, strong interconnection between the outer sleeve, inner sleeve and the drill string member, the inner and outer sleeves being readily removable, when necessary, for relocation on the drill string or for replacement by another inner and outer sleeve combination similarly shrink-fitted onto the drill string. The outer sleeve, positioned on the drill string, may be a stabilizer sleeve, a wear protection sleeve, a reamer, and the like.

39 Claims, 11 Drawing Figures

SHRINK-FIT SLEEVE APPARATUS FOR DRILL STRINGS

This application is a Continuation-In-Part of our application Ser. No. 465,818, filed May 1, 1974, for "Shrink-Fit Sleeve Apparatus for Drill Strings" now abandoned.

The present invention relates to rotary bore hole apparatus, and more particularly to apparatus, such as a stabilizer, wear sleeve, reamer, and the like, mounted on a drill string to control its deflection, reduce or eliminate abrasive wear on the drill string members, or to insure the drilling of the bore hole to its required diameter.

In the rotary drilling of bore holes, the length of the drill string, which is made up of drill collars and drill pipe sections, can be several miles long. The relatively small diameter of the drill string members compared to the drill string length makes it very flexible. In addition, the lower portion of the drill string nearest the drill bit is in compression during rotary drilling, so that weight can be applied to the drill bit attached to the lower end of the drill string, which causes the lower section to tend to assume a deflected or bowed condition during drilling.

The deflected drill collar string can contact the wall of the well bore, causing wear on the drill collars. Since the drill bit is rigidly attached to the collars, the drill bit is pointed in some direction which may differ from the desired path of the well bore. The location or locations where the drill collars contact the well bore determines the lateral force at the bit, and this lateral force at the bit can also move the bit from the desired path for the hole.

Drill string stabilizers have been used to help resolve the above problems. However, the methods of attaching the stabilizers limited their effectiveness. One method included the attachment of stabilizer ribs by welding them onto a drill collar body, which is normally undesirable because the welded joint may fail, large pieces of metal remaining in the hole. In addition, once the ribs are attached to the drill collar body, they cannot be relocated conveniently along the length of the drill string. Integral blade stabilizers are available, but they have the disadvantage of requiring at least one additional drill collar connection, since they are mounted on or form an integral part of a short collar sub. This may increase the difficulty of retrieving the drill string members if the drill string becomes disconnected in the bore hole. In addition, the desired lengths of drill collar subs may not be available at the rig site, preventing relocation of the stabilizers except after substantial delay.

The optimum location for stabilizers on the drill collars for a specific set drilling conditions can be predetermined, in order to keep the drill collars from contacting the wall of the bore hole, aim the drill bit in the desired direction, and force the drill bit in such desired direction. If the proper technique of locating the stabilizers along the length of the drill collars is not observed, it may cause the collars to undergo excessive stress and stain. If the stabilizers are located too far apart, they will not prevent the drill collars from contacting the hole wall, the collars becoming worn by rubbing thereagainst. If the proper locations are not used, control over the direction of drilling will also be lost.

The shrink-fitting of stabilizers and the like on drill string members is known, being illustrated and described in U.S. Ser. No. 430,077, filed Jan. 2, 1974, for "Stabilizer for Drill Strings". However, the stabilizers disclosed therein can be placed at predetermined locations along the drill string through the provision of special subs at such locations on which the stabilizers have been shrink-fitted. Relocation of the stabilizers cannot be undertaken readily, and particularly at the drill site. In addition, the shrink-fitting of a stabilizer sleeve on a drill collar sub or body member required accurate machining of a conical surface on the drill collar member, and also in the stabilizer sleeve, to close tolerances so that they accurately match each other.

By virtue of the present invention, a stabilizer sleeve, or, for that matter, a wear sleeve or a reamer, can be mounted at any desired position along the length of a one-piece drill collar having a cylindrical periphery. No separate subs of predetermined length and configuration are necessary, since the sleeve is affixed directly to the cylindrical drill collar itself. As a result, difficult machining of an accurate conical surface on a drill collar sub is eliminated, as in prior arrangements. When the sleeves are stabilizers, they can be spaced from one another by the optimum distances to maintain the drill collars from contacting the hole, to direct the drilling bit properly, and to force the latter in the desired direction. In the event that drilling conditions change, requiring different locations of the stabilizers along the length of the drill collars, the stabilizers are readily releasable from the cylindrical periphery of the drill collars for relocation at the desired points. A stabilizer can be mounted on the lowermost drill collar immediately adjacent the drill bit, which is highly desirable in preventing deviation of the drill bit from its desired path. In addition to being readily removable for relocation, stabilizers, and, for that matter, wear protective devices or reamers, can be removed from the drill string and replaced by corresponding new devices, and such replacement can occur at the rig site in a facile and rapid manner.

By virtue of the ability to locate stabilizers at the optimum points along the length of the drill collars, a higher drill bit weight can be used which increases the bit penetration rate, thereby reducing the cost per foot of drilling the bore hole. In addition, a drill bit is capable of drilling a much greater footage of hole, which further decreases the cost per foot of drilling the bore hole.

This invention possesses many other advantages, and has other purposes which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense.

Referring to the drawings.

Figure 1:
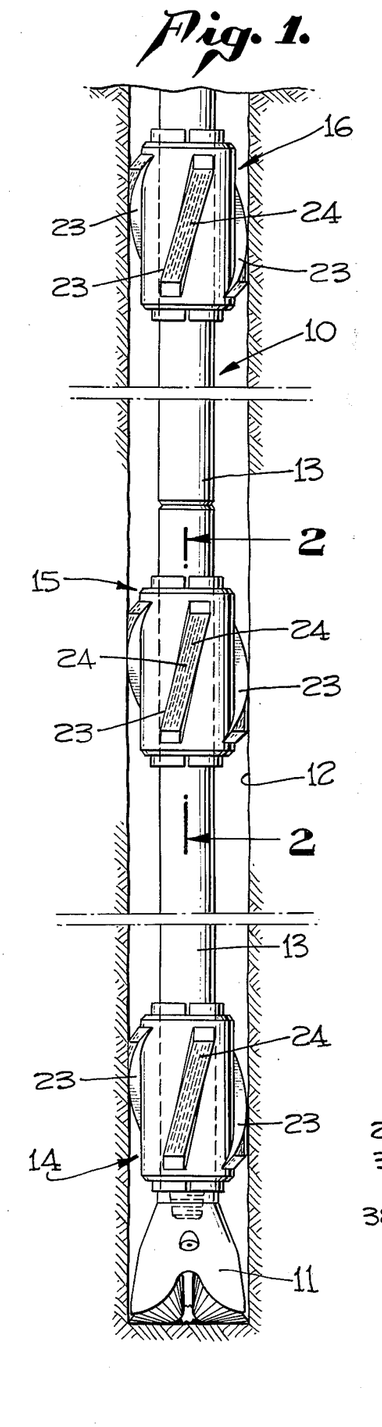
FIG. 1 is a side elevational view of the lower portion of a rotary drill string, with stabilizers mounted thereon and embodying the invention.

As disclosed in FIG. 1, the lower portion of a drill string 10 is disclosed, the bottom end of which is secured to a rotary drill bit 11 for drilling a bore hole 12. As shown, drill collars 13 are threadedly secured to one another in a known manner, the uppermost drill collar being attached to drill pipe (not shown) extending to a drilling rig (not shown) and through which the entire drill string is rotated to effect the rotation of the drill bit and the transmission of the required torque thereto in the production of the bore hole. Longitudinally spaced stabilizer devices 14, 15, 16 are mounted at preselected locations along the length of the drill collar string. As specifically disclosed, a near-bit stabilizer apparatus 14 is mounted on the lowermost drill collar immediately adjacent to the drill bit 11. At a predetermined location thereabove, a second stabilizer apparatus 15 is firmly secured to a drill collar section 13, and at yet a higher elevation along the length of the drill collar string, a third stabilizer apparatus 16 is firmly secured to a section 13 of the drill collar string. By way of example, the intermediate and upper stabilizer apparatus 15, 16 may be spaced about 16' and 49', respectively, from the bit 11. This spacing will vary, depending upon drilling conditions and the formation being drilled.

Each of the stabilizers disclosed includes an inner sleeve 17 having an internal cylindrical surface 18 conforming to the cylindrical periphery 19 of the drill collar 13 on which it is mounted. The outer surface 20 of each inner sleeve is conical or tapered at a small angle to the sleeve axis. By way of example, the angle of taper may be from about 1½° to about 4°. An external sleeve 21 is mounted on the internal sleeve, having a conical or tapered internal surface 22 companion to the external surface 20 on the inner sleeve. The external sleeve 21, as specifically illustrated in FIGS. 1 to 5, inclusive, is formed as a stabilizer having circumferentially spaced longitudinally extending helical ribs 23 adapted to engage the wall of the bore hole 12. Typically, these ribs have hardfacing material 24 on their outer surfaces for resisting wear when bearing against the wall of the hole during rotation of the drill string, drill bit, and of the stabilizer apparatus secured at the predetermined locations on the drill collars. The ribs may be constituted as cutters for maintaining the bore hole to gauge.

Figure 3:
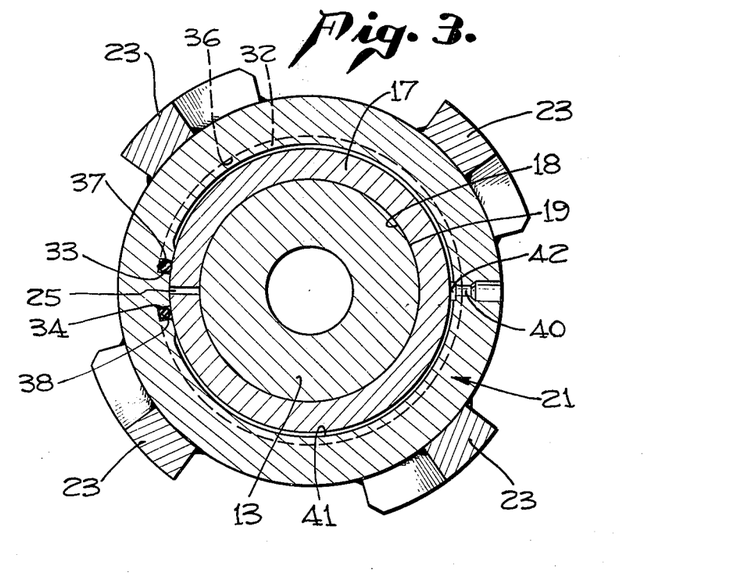
FIG. 3 is an enlarged cross-section taken along the line 3—3 on FIG. 2.

As specifically shown, the inner sleeve 17 has a longitudinal split 25 completely through its wall, to permit the sleeve to flex in a lateral direction, and, therefore, enable its internal cylindrical surface 18 to conform to minor deviations that might be present in the cylindrical periphery 19 of the drill collar. However, the outer sleeve 21 is circumferentially continuous, with its internal surface 22 adapted to frictionally grip the conical external surface 20 of the inner sleeve. The outer sleeve 21 is shrink-fitted onto the inner sleeve 17, forcing the latter into shrink-fitted engagement with the drill collar 13, the shrink-fitting being effected hydraulically, as described hereinbelow in connection with FIG. 5 of the drawings.

Figure 2:
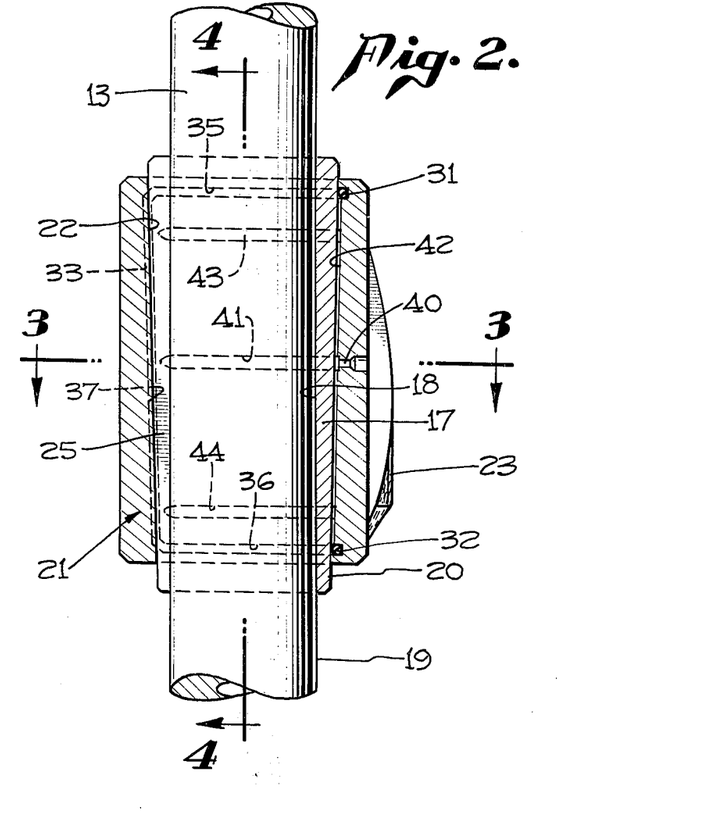
FIG. 2 is an enlarged longitudinal section taken along the line 2—2 on FIG. 1.
Figure 4:
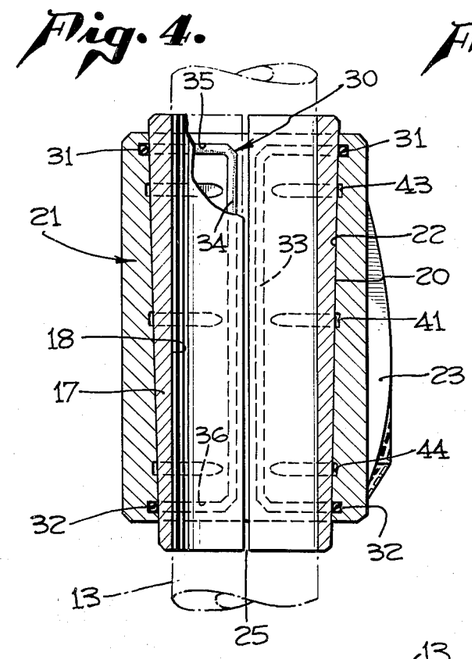
FIG. 4 is a longitudinal section taken along the line 4—4 on FIG. 2.

It is to be noted that the outer sleeve has an elastomer seal ring structure 30, including circumferential upper and lower portions 31, 32 each extending slightly less than 360° around the circumference of the outer sleeve. The circumferential portions are integral with opposed longitudinal seal ring portions 33, 34 laterally spaced from each other and extending on opposite sides of the longitudinal split 25 through the inner seal. The portions 31, 32 of the seal ring structure 30 are disposed in internal circumferential grooves 35, 36 that merge into longitudinal grooves 37, 38 within the outer sleeve containing the longitudinal seal ring portions 33, 34, the upper and lower seal ring portions sealingly engaging the periphery of the internal sleeve at locations 17 adjacent to the upper and lower ends of the external sleeve, and the longitudinal seal portions 33, 34 bearing against the exterior surface 20 of the sleeve on opposite sides of its split 25.

Fluid under pressure can be introduced through a port 40 extending through the wall of the outer sleeve 21 to its interior, this pressure being confined by the seal ring structure 30 and effecting hydraulic expansion of the outer sleeve and inward compression of the inner sleeve 17. During such expansion of the outer sleeve and inward compression of the inner sleeve, they are moved longitudinally with respect to one another to force the inner sleeve 17 deeper into the outer sleeve 21, the expansion of the outer sleeve permitting such relative longitudinal or axial movement to take place. After the hydraulic pressure introduced into the outer sleeve has been increased to a desired extent, with the sleeves moved relatively axially of one another, the fluid pressure is relieved, the outer sleeve 21 contracting into firm and secure frictional engagement with the periphery 20 of the inner sleeve 17 and forcing the inner sleeve into firm frictional engagement with the circumferential periphery 19 of the drill collar 13. The inner and outer sleeve combination is, therefore, frictionally secured to the drill collar and is capable of resisting, without slippage, the usual torques and longitudinal forces transmitted to the stabilizer structure during the drilling of the bore hole.

The friction can be increased by appropriately cleaning the external and internal tapered surfaces 20, 22, and also the cylindrical interior 18 of the inner sleeve and the periphery of the drill collar where the stabilizer apparatus is to be mounted, then coating the cleaned surfaces with a suitable abrasive material. By way of example, the material may be 10% by volume of tungsten carbide powder of 200 mesh size suspended in a light oil. The sleeves are then mounted on the drill collar at the desired location, as described above, the hydraulic pressure applied to expand the outer sleeve 21 while axial forces are exerted on the inner and outer surfaces 17, 21 in opposite directions to relatively wedge the inner sleeve within the outer sleeve, whereupon the hydraulic pressure is released, allowing the shrink-fitting of the inner and outer sleeves 17, 21 upon the drill collar 13 and inner sleeve 17, respectively.

To facilitate distribution of the hydraulic fluid and pressure over the entire surface of the outer sleeve 21 bounded by its seal ring structure 30, the port 40 of the outer sleeve communicates with an internal groove 41 in the outer sleeve extending therearound and terminating just short of the grooves 37, 38 containing the longitudinal seal portions 33, 34. A longitudinal internal groove 42 also extends from the port 40 in both directions to the upper and lower circumferential seal ring portions 31, 32, the upper and lower portions of this internal groove communicating with upper and lower circumferential grooves 43, 44 extending around the inner surface of the outer sleeve to the same extent as the central groove 41. By virtue of the circumferential and longitudinal groove arrangement, assurance is had that the fluid pressure will be applied to the entire internal area of the outer sleeve 21 bounded by the seal ring structure 30, to secure a more uniform expansion of the sleeve during its mounting on the inner sleeve and the wedging of the inner sleeve within the outer sleeve.

Figure 5:
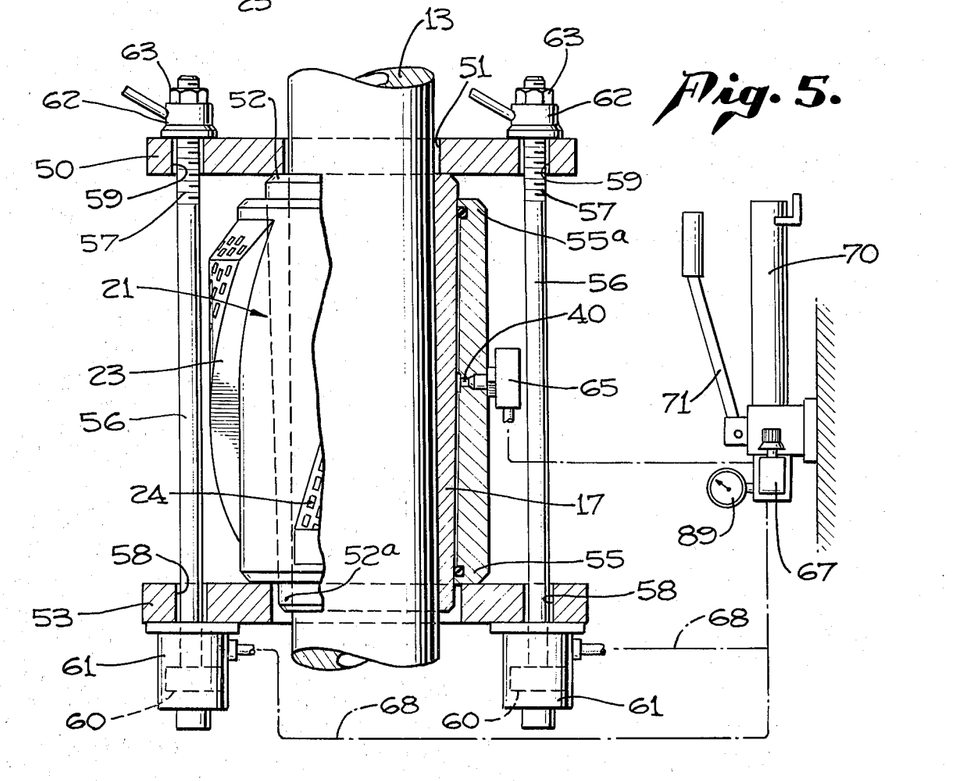
FIG. 5 illustrates the manner of mounting a stabilizer sleeve on a drill collar member at a desired location along its length.

An apparatus for frictionally mounting the inner sleeve and stabilizer sleeve on the drill collar member is disclosed in FIG. 5. The split inner sleeve 17 is placed on the drill collar 13, whereupon the outer sleeve 21 is mounted thereon and shifted upwardly until the seal ring structure 30 is sealingly engaging the tapered periphery 20 of the inner sleeve. An upper plate 50 having a central bore 51 therethrough is then slipped over the drill collar member 13 and is brought to bear against the large end 52 of the inner sleeve 17. A second plate 53 having a bore 54 therethrough is then slipped over the drill collar from its opposite end and brought to bear against the end 55 of the outer sleeve 21. Piston rods 56 having threaded ends 57 are then moved through holes 58 in the lower plate and aligned holes 59 in the upper plate, these piston rods being suitably connected to pistons 60 disposed within cylinders 61 brought to bear against the lower end of the lower plate 53. Collars 62 are mounted on the threaded ends of the piston rods, engaging the upper surface of the upper plate 50, suitable nuts 63 then being threaded on the ends of the threaded rods to firmly force the collars against the upper plate.

A fitting 65 is connected to the outer sleeve in communication with the port 40, a pressure hose line 66 extending therefrom to a valve gear block 67. Similarly, pressure hose lines 68 extend from the cylinders 61 to the valve gear block 67, which has a control monometer 69 connected thereto to indicate the pressure in the pressure hose lines. Hydraulic pressure is applied through a suitable hydraulic pump unit 70 that can be hand operated through manipulation of a lever 71. The pressure derived from the hydraulic pump unit passes through the pressure hose line 66 and through the port 40 to the interior of the outer sleeve 21. At the same time, fluid under pressure passes into the cylinders 61, forcing them upwardly against the lower plate 53 and the pistons 60 and piston rods 56 relatively downwardly of the cylinders, to cause the rods and the collars 62 and nuts 63 thereon to bear downwardly against the upper plate 50, the upper plate moving the inner sleeve 17 axially in the direction of its taper, while the cylinders 61 move the outer sleeve 21 in the opposite direction at the same time. The pressure is increased to further expand the outer sleeve 21 while the outer and inner sleeves are moved axially with respect to each other to cause the outer sleeve 21 to advance upwardly along the taper or conical surface 20 of the inner sleeve, until a desired pressure is reached, which, by way of example, can range from about 6,000 psi to about 14,000 psi, depending upon the dimensions of the parts. The pressure is then relieved, which allows the outer sleeve 21 to contract inherently and shrink-fit around the inner sleeve 17, contracting the inner sleeve against the periphery 19 of the drill collar 13, thereby effecting the attachment by shrink-fitting of the inner and outer sleeves on the drill collar. The friction force between the parts is relatively great and easily capable of withstanding the torque and longitudinal forces imposed by the drill collar 13 on the inner sleeve 17 and outer sleeve 21 during use of the apparatus. The assembly apparatus can then be released and removed from the collar 13.

In the event the stabilizer apparatus is to be removed from the drill collar, the assembly apparatus can be reversed from the position shown, the plate 50 engaging the lower end 52a of the inner sleeve and the plate 53 the upper end 55a of the outer sleeve. The pressure is applied by the pump through the port 40 to the outer sleeve 21 to expand the latter, while, at the same time, the plates 50, 53 shift the inner sleeve 17 in an upward direction and the outer sleeve 21 in a downward direction to unwedge and release the sleeves from one another and effect release of the inner sleeve 17 from the drill collar 13.

Figure 6:
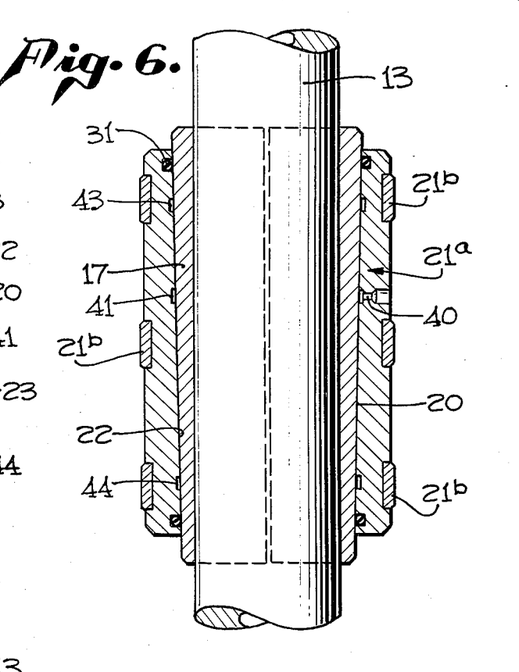
FIG. 6 is a view similar to FIG. 4 illustrating the invention as applied to a wear sleeve mounted at a desired location along the length of a drill collar member.

In the form of invention illustrated in FIG. 6, the outer sleeve 21a is a wear member which may have bands 21b of wear resistant material, such as tungsten carbide, mounted on its periphery. The inner and outer sleeves 17, 21a bear the same structural relation to one another as illustrated and described in connection with the stabilizer apparatus, being mounted on the drill collar 13 at a desired location in the same manner. Ordinarily, each wear sleeve 21a does not engage the wall of the bore hole. However, one or more sleeves are mounted on the drill collar or collars at required points along their length, to insure that the drill collars will not contact the wall of the hole, which would produce wear thereon during rotation of the drill collar string while it is being subjected to compressive forces as a result of its application of drilling weight to the drill bit.

Although it is desirable to employ a split inner sleeve, it may be unsplit and will still function properly since it is ordinarily relatively thin, when compared to the outer sleeve, and deformable under the hydraulic pressure applied to the interior of the outer sleeve and under the shrinking action of the outer sleeve upon release of the hydraulic force therewithin. When the sleeve is not split, the longitudinal portions of the seal ring structure in the outer sleeve need not be used, the upper and lower seal ring portions and their companion ring grooves being circumferentially continuous.

In the form of invention illustrated in FIGS. 7 to 10, inclusive, in lieu of the sleeve 17 having a single split 25, as disclosed in FIG. 3, the inner split sleeve 17a is made of two corresponding like segments or sectors, each preferably having the same arcuate extent slightly less than 180°. With the single split sleeve, such as illustrated in FIG. 3, an unbalance of radial pressure or stress results. When hydraulic pressure is applied between the inner and outer sleeves 17, 21, such pressure will exert its expanding force around the circumferential extent of the sleeve, except for the relatively short arcuate distance between the longitudinal seal rings 33, 34. Accordingly, while expanding hydraulic pressure force is being exerted between the outer sleeve and the inner sleeve in the region diametrically opposite the split 25, such force is not being exerted directly at the region of the split. There will be some outer sleeve expansion at the split, caused by the hydraulic outer sleeve expansion adjacent to the region of the split, which is transferred through the metal of the outer sleeve to its portion overlapping the split. The result is that the expanding force diametrically opposite the sleeve is several times greater than the expanding force on the outer sleeve at the split between the longitudinal seal rings.

Upon relieving the hydraulic pressure, the outer sleeve 21 contracts against the inner sleeve 17 in the region diametrically opposite the sleeve with a far greater shrinking force than exists at the region of the split. By way of example, with a 17½ inches outside diameter hydraulic drill collar stabilizer assembly, a shrinking force of the outer sleeve upon the inner sleeve in the region diametrically opposite the sleeve would be greater than the shrinking force at the region of the split by approximately 200,000 lbs., the unbalanced radial stress in the region opposite the split being approximately 7,000 p.s.i. Galling or fretting of the contacting steel surfaces results where the sleeves contact opposite the split.

To avoid the undesired galling or fretting just referred to, the inner sleeve 17a disclosed in FIGS. 7 to 10 is made in two parts or sectors 17b, 17b confronting one another, providing a two-piece, double split sleeve in which the splits 25, 25 are diametrically opposite one another. The two-piece sleeve 17a has the same internal cylindrical surface as the sleeve with a single split, as well as the same external tapered surface. The outer sleeve or stabilizer sleeve 21 is substantially the same as illustrated in FIGS. 1 to 4, inclusive, except that the seal rings 30 have been modified. As shown in the FIGS. 7 and 8 embodiment, the outer sleeve has upper and lower arcuate seal ring grooves 35a, 36a merging into longitudinal grooves 37a, 38a that are disposed near the longitudinal ends of a sleeve sector. A continuous seal structure 30a is disposed in such grooves, longitudinal portions 33a, 34a being disposed within the longitudinal grooves 37a, 38a and merging into upper and lower seal ring portions 31a, 32a in the upper and lower grooves 35a, 36a. A pair of seal ring grooves and seal rings are provided, one for sealing against the periphery of each sector or segment 17 b.

Figures 7, 8, 9, 10, 11:
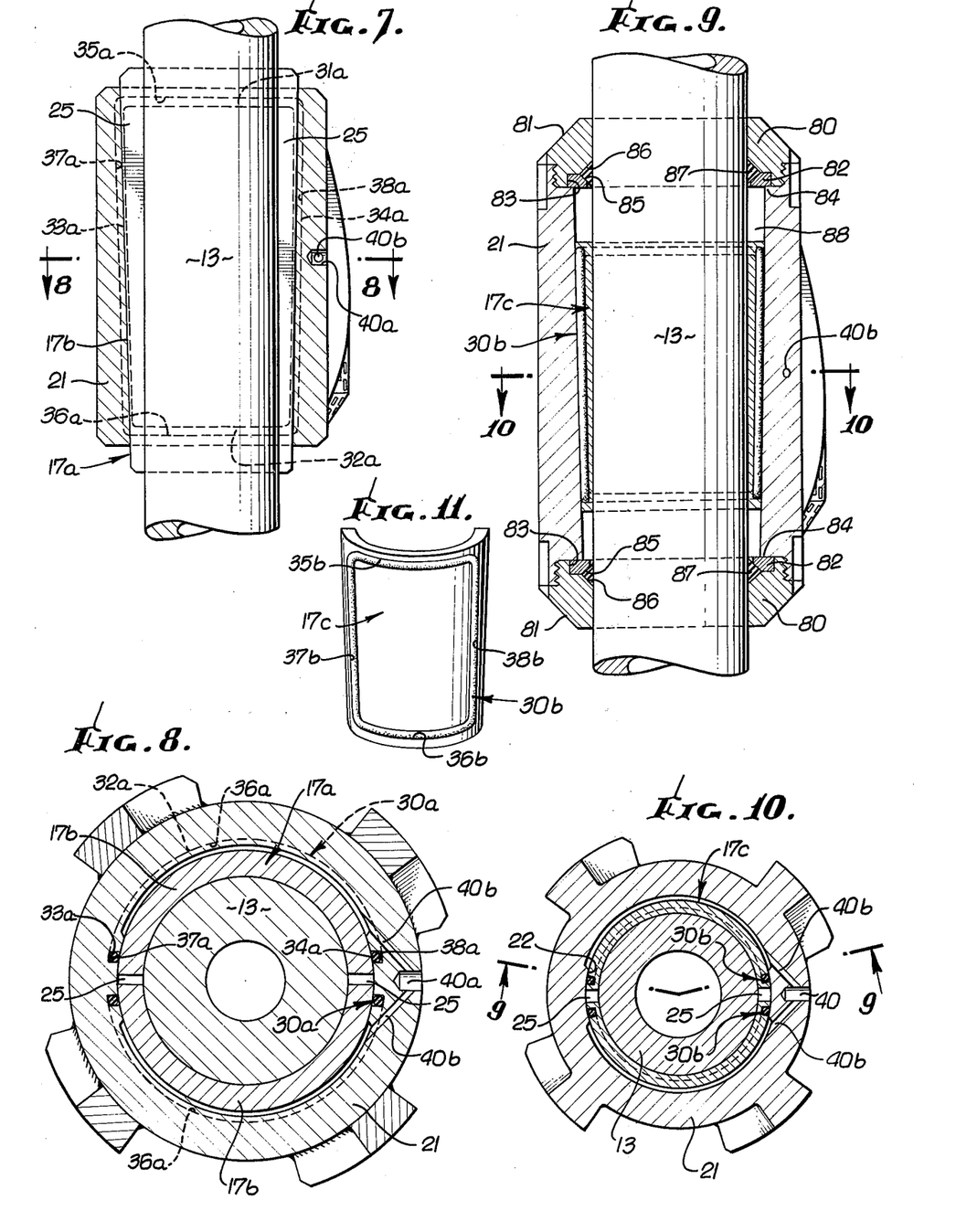
FIG. 7 is a view similar to FIG. 2 disclosing another embodiment of the invention.
FIG. 8 is an enlarged cross-section taken along the line 8—8 on FIG. 7.
FIG. 9 is a view corresponding to FIGS. 2 and 7 of still a further embodiment of the invention.
FIG. 10 is cross-section taken along the line 10—10 on FIG. 9.
FIG. 11 is an isometric view of an inner sleeve of the FIGS. 9 and 10 embodiment.

Fluid under hydraulic pressure can be introduced through a port 40a in the outer sleeve, which communicates with a pair of port branches 40b, each of which leads into the sealed region bounded by the seal structure 30 for each sector. Fluid pressure will be applied to the entire internal area of the outer sleeve bounded by the seal structures 30 for both sectors. As the pressure is increased, the outer sleeve 21 is expanded and the sectors compressed while the inner and outer sleeves 17a, 21 are shifted longitudinally with respect to one another to, in effect, force the inner sleeve 17a relatively downwardly within the outer sleeve 21 to the required extent. Relieving of the pressure will cause the outer sleeve to contract and shrink-fit against the two opposed sectors 17b of the inner sleeve 17a.

The including of the opposed sectors or segments in lieu of the single split sleeve of FIG. 3 results in the elimination of the unbalanced radial pressure or stress that exists with the single split sleeve. Referring to FIG. 8, the radial pressure exerted between the upper segment 17b and the outer sleeve 21 balances the radial pressure exerted between the lower sector 17b and the outer sleeve. The elimination of the unbalanced forces which attend the single split sleeve design prevents the contacting surfaces between the inner sleeve and the outer sleeve from galling or fretting.

In the form of invention illustrated in FIGS. 9 and 10, the opposed sector or double split sleeve design 17c is also used. Instead of the seal ring structures 30b being mounted in the outer sleeve, as in FIGS. 7 and 8, they are mounted on the peripheral portion of the inner two-piece sleeve. Thus, the inner surface 22 of the outer sleeve 21 does not have seal ring grooves provided therein. Instead, the grooves are provided within the opposed sectors of the double split sleeve. Thus, upper and lower arcuate grooves 35b, 36b extend around the periphery of each sector which merge into opposed longitudinal grooves 37b, 38b extending between the upper and lower grooves, these longitudinal grooves terminating short of the upper and lower ends of each sector. A seal ring structure 30b is disposed in the grooves of each sector, the seal ring structure preferably being of one continuous piece of elastomeric material.

The hydraulic pressure for expanding the outer sleeve 21 is also provided through the port 40 and the port branches 40b, each branch opening into the region between a sector and the outer sleeve bounded by the seal structure 30b. The application of pressure effects the expansion of the outer sleeve 21, while the inner sleeve 17c is shifted relatively further into the outer sleeve. After the desired pressure has been applied and the inner sleeve shifted longitudinally within the outer sleeve 21 to the desired extent, the hydraulic pressure is relieved, permitting the outer sleeve 21 to contract and shrink-fit upon the double split inner sleeve 17c, 17c, and shrink-fitting the latter upon the drill collar section 13.

As disclosed in FIG. 9, the inner sleeve 17c can, if desired, be made shorter than the outer sleeve 21, particularly in view of the provision of the seal grooves and seal rings in the inner sleeve. Machining of the grooves in the outer sectors 17c is a much simpler and more economical operation than the formation of the grooves within the outer sleeve, as in FIGS. 7 and 8.

Guide rings 80 may be threadedly secured within the opposite ends of the outer sleeve 21, these guide rings having outer surfaces 81 tapering in a longitudinal outward direction toward the axis of the drill collar body. A washer ring 82 is located in a groove 83 formed between the inner portion of each guide ring 80 and opposed shoulder 84 on the outer sleeve, this ring 80 extending inwardly into close adjacency to the periphery of the collar body 13. Each washer ring 82 may have a beveled inner corner 85 opposed to a beveled surface 86 in the guide ring, providing a generally V-shaped space in which an elastomeric seal 87 is disposed for preventing foreign material from entering the longitudinal space 88 between each washer ring 82 and the neighboring end of the inner sleeve 17c. If desired, oil, grease, and the like, may be packed within this space to insure against entry of contaminating materials between the inner and outer sleeves 17c, 21, as well as into the longitudinal splits 25 between the inner sleeve sectors 17c, 17c.

The outer sleeve 21 and inner sleeve 17c are assembled on the drill collar body or section 13 in the absence of the guide rings 80, washer rings 82 and elastic seals 87. The hydraulic expansion of the outer sleeve 21 and the relative longitudinal shifting between the sleeves 21, 17c takes place and the shrink-fit effected, after which the end guide rings 80, washers 82 and seal rings 87 can be assembled and secured in place by threading the guide rings 80 within the upper and lower ends of the outer sleeve 21, as illustrated in FIG. 9.

We claim:

1. Apparatus adapted to be disposed in a bore hole, comprising a drill string member having a cylindrical exterior surface, an inner sleeve on said member and having an internal cylindrical surface conforming to the cylindrical surface of said member, said sleeve also having an external conical surface, an outer sleeve surrounding said inner sleeve and having an internal conical surface conforming to said external conical surface and in contact therewith, spaced seal means between the exterior of said inner sleeve and interior of said outer sleeve providing a confined region for tapping fluid under pressure between said sleeves, and means for conducting fluid under pressure to said confined region to expand said outer sleeve and enable said outer sleeve to be moved relatively longitudinally along said inner sleeve outer surface to shrink-fit said outer sleeve on said inner sleeve and said inner sleeve on said drill string member upon relieving of the fluid pressure.

2. Apparatus as defined in claim 1, said outer sleeve being a stabilizer engageable with the wall of the bore hole.

3. Apparatus as defined in claim 1, said outer sleeve being a wear resistant member engageable with the wall of the bore hole to prevent contact of the drill string member therewith.

4. Apparatus as defined in claim 1, the angle of taper of said conical surfaces ranging from about 1-½° to about 4°.

5. Apparatus as defined in claim 1, the angle of taper of said conical surfaces ranging from about 1-½° to about 4°, said outer sleeve being a stabilizer engageable with the wall of the bore hole.

6. Apparatus as defined in claim 1, the angle of taper of said conical surfaces ranging from about 1-½° to about 4°, said outer sleeve being a wear resistant member engageable with the wall of the bore hole to prevent contact of the drill string member therewith.

7. Apparatus as defined in claim 1, said inner sleeve having at least one split extending throughout its length, said seal means including laterally spaced circumferential portions, said seal means further including longitudinal portions adjacent said split extending between said circumferential portions.

8. Apparatus as defined in claim 1, said inner sleeve having at least one split extending throughout its length, said seal means including laterally spaced circumferential portions, said seal means further including longitudinal portions adjacent said split extending between said circumferential portions, said outer sleeve being a stabilizer engageable with the wall of the bore hole.

9. Apparatus as defined in claim 1, said inner sleeve having at least one split extending throughout its length, said seal means including laterally spaced circumferential portions, said seal means further including longitudinal portions adjacent said split extending between said circumferential portions, said outer sleeve being a wear resistant member engageable with the wall of the bore hole to prevent contact of the drill string member therewith.

10. Apparatus as defined in claim 1, said inner sleeve having at least one split extending throughout its length, said seal means including laterally spaced circumferential portions, said seal means further including longitudinal portions adjacent said split extending between said circumferential portions, the angle of taper of said conical surfaces ranging from about 1-½° to about 4°.

11. Apparatus as defined in claim 1, said inner sleeve having at least one split extending throughout its length, said seal means including laterally spaced circumferential portions, said seal means further including longitudinal portions adjacent said split extending between said circumferential portions, the angle of taper of said conical surfaces ranging from about 1-½° to about 4°, said outer sleeve being a stabilizer engageable with the wall of the bore hole.

12. Apparatus as defined in claim 1, said inner sleeve having at least one split extending throughout its length, said seal means including laterally spaced circumferential portions, said seal means further including longitudinal portions adjacent said split extending between said circumferential portions, the angle of taper of said conical surfaces ranging from about 1-½° to about 4°, said outer sleeve being a wear resistant member engageable with the wall of the bore hole to prevent contact of the drill string member therewith.

13. Apparatus adapted to be mounted on a cylindrical exterior of a drill string member disposable in a bore hole, comprising an inner sleeve having an internal cylindrical surface conforming to the cylindrical surface of the drill string member and an external conical surface, an outer sleeve surrounding said inner sleeve and having an internal conical surface conforming to said external conical surface and in contact therewith, said inner sleeve having at least one split extending throughout its length, spaced seal means between the exterior of said inner sleeve and interior of said outer sleeve providing a confined region for trapping fluid under pressure between said sleeves, said seal means including longitudinally spaced circumferential portions and further including longitudinal portions adjacent said split extending between said circumferential portions, and means for conducting fluid under pressure to said confined region to expand said outer sleeve and enable said outer sleeve to be moved relatively longitudinally along said conical outer surface to shrink-fit said outer sleeve on said inner sleeve and said inner sleeve on the drill string member upon relieving of the fluid pressure.

14. Apparatus as defined in claim 13, said outer sleeve being a stabilizer engageable with the wall of the bore hole.

15. Apparatus as defined in claim 13, said outer sleeve being a wear resistant member engageable with the wall of the bore hole to prevent contact of the drill string member therewith.

16. Apparatus as defined in claim 13, the angle of taper of said conical surfaces ranging from about 1-½° to about 4°.

17. Apparatus as defined in claim 13, the angle of taper of said conical surfaces ranging from about 1-½° to about 4°, said outer sleeve being a stabilizer engageable with the wall of the bore hole.

18. Apparatus as defined in claim 13, the angle of taper of said conical surfaces ranging from about 1-½° to about 4°, said outer sleeve being a wear resistant member engageable with the wall of the bore hole to prevent contact of the drill string member therewith.

19. Apparatus as defined in claim 1, said seal means including an internal groove in said outer sleeve, and an elastomer seal in said groove sealingly engaging said conical surface of said inner sleeve.

20. Apparatus as defined in claim 1, said inner sleeve having at least one split extending throughout its length, said seal means including longitudinally spaced circumferential grooves in said outer sleeve, longitudinal grooves in said outer sleeve adjacent said split and extending between said circumferential grooves, and an elastomer seal in said grooves sealingly engaging said conical surface of said inner sleeve opposite said circumferential grooves adjacent said split.

21. Apparatus as defined in claim 13, said longitudinally spaced circumferential portions of said seal means including longitudinally spaced circumferential grooves in said outer sleeve, said longitudinal portions of said seal means adjacent said split including longitudinal grooves in said outer sleeve extending between said circumferential grooves, said seal means further including an elastomer seal in said grooves sealingly engaging said conical surface of said inner sleeve opposite said circumferential grooves adjacent said split.

22. Apparatus as defined in claim 1; said inner sleeve having a plurality of splits extending throughout its length to provide separate sleeve sectors which collectively have said external conical surface, said spaced seal means being provided between the exterior of each sector and interior of said outer sleeve providing confined regions for trapping fluid under pressure between said sectors and outer sleeve, said conducting means conducting fluid under pressure to said confined regions.

23. Apparatus as defined in claim 1; said inner sleeve having a pair of diametrically opposed splits extending throughout its length to provide a pair of opposed sleeve sectors which collectively have said external conical surface, said spaced seal means being provided between the exterior of each sector and interior of said outer sleeve providing confined regions for trapping fluid under pressure between said sectors and outer sleeve, said conducting means conducting fluid under pressure to said confined regions.

24. Apparatus as defined in claim 1; said inner sleeve having a plurality of splits extending throughout its length to provide separate sleeve sectors which collectively have said external conical surface, said spaced seal means being provided between the exterior of each sector and interior of said outer sleeve providing confined regions for trapping fluid under pressure between said sectors and outer sleeve, said conducting means conducting fluid under pressure to said confined regions, said seal means including internal grooves in said outer sleeve, and elastomer seals in said grooves sealingly engaging said external conical surface.

25. Apparatus as defined in claim 1; said inner sleeve having a plurality of splits extending throughout its length to provide separate sleeve sectors which collectively have said external conical surface, said spaced seal means being provided between the exterior of each sector and interior of said outer sleeve providing confined regions for trapping fluid under pressure between said sectors and outer sleeve, said conducting means conducting fluid under pressure to said confined regions, said seal means including external grooves in said sectors, and elastomer seals in said grooves sealingly engaging said internal conical surface.

26. Apparatus as defined in claim 1; said inner sleeve having a pair of diametrically opposed splits extending throughout its length to provide a pair of opposed sleeve sectors which collectively have said external conical surface, said spaced seal means being provided between the exterior of each sector and interior of said outer sleeve providing confined regions for trapping fluid under pressure between said sectors and outer sleeve, said conducting means conducting fluid under pressure to said confined regions, said seal means including external grooves in said sectors, and elastomer seals in said grooves sealingly engaging said internal conical surface.

27. Apparatus as defined in claim 1; said inner sleeve being shorter than said outer sleeve and disposed entirely within said outer sleeve between the ends of said outer sleeve.

28. Apparatus as defined in claim 1; said inner sleeve being shorter than said outer sleeve and disposed entirely within said outer sleeve between the ends of said outer sleeve, and ring means secured to the outer end portions of said outer sleeve and extending laterally to said drill string member to enclose said inner sleeve within said outer sleeve.

29. Apparatus as defined in claim 1; said inner sleeve being shorter than said outer sleeve and disposed entirely within said outer sleeve between the ends of said outer sleeve, said inner sleeve having a pair of diametrically opposed splits extending throughout its length to provide a pair of opposed sleeve sectors which collectively have said external conical surface, said spaced seal means being provided between the exterior of each sector and interior of said outer sleeve providing confined regions for trapping fluid under pressure between said sectors and outer sleeve, said conducting means conducting fluid under pressure to said confined regions, said seal means including external grooves in said sectors, and elastomer seals in said grooves sealingly engaging said internal conical surface.

30. Apparatus as defined in claim 1; said inner sleeve being shorter than said outer sleeve and disposed entirely within said outer sleeve between the ends of said outer sleeve, said inner sleeve having a pair of diametrically opposed splits extending throughout its length to provide a pair of opposed sleeve sectors which collectively have said external conical surface, said spaced seal means being provided between the exterior of each sector and interior of said outer sleeve providing confined regions for trapping fluid under pressure between said sectors and outer sleeve, said conducting means conducting fluid under pressure to said confined regions, said seal means including external grooves in said sectors, and elastomer seals in said grooves sealingly engaging said internal conical surface, and ring means secured to the outer end portions of said outer sleeve and extending laterally to said drill string member to enclose said inner sleeve within said outer sleeve.

31. Apparatus as defined in claim 13; said inner sleeve having a plurality of splits extending throughout its length to provide separate sleeve sectors which collectively have said external conical surface, said spaced seal means being provided between the exterior of each sector and interior of said outer sleeve providing confined regions for trapping fluid under pressure between said sectors and outer sleeve, said conducting means conducting fluid under pressure to said confined regions.

32. Apparatus as defined in claim 13; said inner sleeve having a pair of diametrically opposed splits extending throughout its length to provide a pair of opposed sleeve sectors which collectively have said external conical surface, said spaced seal means being provided between the exterior of each section and interior of said outer sleeve providing confined regions for trapping fluid under pressure between said sectors and outer sleeve, said conducting means conducting fluid under pressure to said confined regions.

33. Apparatus as defined in claim 13; said inner sleeve having a plurality of splits extending throughout its length to provide separate sleeve sectors which collectively have said external conical surface, said spaced seals means being provided between the exterior of each sector and interior of said outer sleeve providing confined regions for trapping fluid under pressure between said sectors and outer sleeve, said conducting means conducting fluid under pressure to said confined regions, said seal means including internal grooves in said outer sleeve, and elastomer seals in said grooves sealingly engaging said external conican surface.

34. Apparatus as defined in claim 13; said inner sleeve having a plurality of splits extending throughout its length to provide separate sleeve sectors which collectively have said external conical surface, said spaced seal means being provided between the exterior of each sector and interior of said outer sleeve providing confined regions for trapping fluid under pressure between said sectors and outer sleeve, said conducting means conducting fluid under pressure to said confined regions, said seal means including external grooves in said sectors, and elastomer seals in said grooves sealingly engaging said internal conical surface.

35. Apparatus as defined in claim 13; said inner sleeve having a pair of diametrically opposed splits extending throughout its length to provide a pair of opposed sleeve sectors which collectively have said external conical surface, said spaced seal means being provided between the exterior of each section and interior of said outer sleeve providing confined regions for trapping fluid under pressure between said sectors and outer sleeve, said conducting means conducting fluid under pressure to said confined regions, said seal means including external grooves in said sectors, and elastomer seals in said grooves sealingly engaging said internal conical surface.

36. Apparatus as defined in claim 13; said inner sleeve being shorter than said outer sleeve and disposed entirely within said outer sleeve between its ends.

37. Apparatus as defined in claim 13; said inner sleeve being shorter than said outer sleeve and disposed entirely within said outer sleeve between its ends, and ring means secured to the outer end portions of said outer sleeve and adapted to extend laterally to the drill string member to enclose said inner sleeve within said outer sleeve.

38. Apparatus as defined in claim 13; said inner sleeve being shorter than said outer sleeve and disposed entirely within said outer sleeve between its ends, said inner sleeve having a pair of diametrically opposite splits extending throughout its length to provide a pair of opposed sleeve sectors which collectively have said external conical surface, said spaced seal means being provided between the exterior of each sector and interior of said outer sleeve providing confined regions for trapping fluid under pressure between said sectors and outer sleeve, said conducting means conducting fluid under pressure to said confined regions, said seal means including external grooves in said sectors, and elastomer seals in said grooves sealingly engaging said internal conical surface.

39. Apparatus as defined in claim 13; said inner sleeve being shorter than said outer sleeve and disposed entirely within said outer sleeve between its ends, said inner sleeve having a pair of diametrically opposite splits extending throughout its length to provide a pair of opposed sleeve sectors which collectively have said external conical surface, said spaced seal means being provided between the exterior of each sector and interior of said outer sleeve providing confined regions for trapping fluid under pressure between said sectors and outer sleeve, said conducting means conducting fluid under pressure to said confined regions, said seal means including external grooves in said sectors, and elastomer seals in said grooves sealingly engaging said internal conical surface, and ring means secured to the outer end portions of said outer sleeve and adapted to extend laterally to the drill string member to enclose said inner sleeve within said outer sleeve.

* * * * *